(12) United States Patent
Lair (10) Patent No.: US 8,052,086 B2
(45) Date of Patent: Nov. 8, 2011

(54) THRUST REVERSER DOOR

(75) Inventor: Jean-Pierre Lair, San Antonio, TX (US)

(73) Assignee: The NORDAM Group, Inc., Tulsa, OK (US)

( * ) Notice: Subject to any disclaimer, the term of this patent is extended or adjusted under 35 U.S.C. 154(b) by 1026 days.

(21) Appl. No.: 11/941,391

(22) Filed: Nov. 16, 2007

(65) Prior Publication Data

US 2009/0126342 A1 May 21, 2009

(51) Int. Cl.
  *F02K 1/54* (2006.01)
(52) U.S. Cl. .................................. 244/110 B; 60/226.2
(58) Field of Classification Search ................. 60/226.2; 244/110 B
  See application file for complete search history.

(56) References Cited

U.S. PATENT DOCUMENTS

| | | |
|---|---|---|
| 2,847,823 A | 8/1958 | Brewer |
| 3,347,578 A | 10/1967 | Sheehan et al. |
| 3,492,821 A | 2/1970 | Monaghan et al. |
| 3,541,794 A | 11/1970 | Johnston et al. |
| 3,550,855 A | 12/1970 | Feld et al. |
| 3,610,534 A | 10/1971 | Medawar |
| 3,640,468 A | 2/1972 | Searle et al. |
| 3,660,982 A | 5/1972 | Gozlan |
| 3,684,182 A | 8/1972 | Maison |
| 3,856,239 A | 12/1974 | Leibach |
| 4,047,381 A | 9/1977 | Smith |
| 4,129,269 A | 12/1978 | Fage |
| 4,175,385 A | 11/1979 | Nash |
| 4,182,501 A | 1/1980 | Fage |
| 4,212,442 A | 7/1980 | Fage |
| 4,232,516 A | 11/1980 | Lewis et al. |
| 4,292,803 A | 10/1981 | Prior |
| 4,362,015 A | 12/1982 | Fage |
| 4,422,605 A | 12/1983 | Fage |
| 4,424,669 A | 1/1984 | Fage |
| 4,519,561 A | 5/1985 | Timms |
| 4,581,890 A | 4/1986 | Giraud |
| 4,682,733 A | 7/1987 | Newton |
| 4,801,112 A | 1/1989 | Fournier |
| 4,830,519 A | 5/1989 | Starke |
| 4,836,451 A | 6/1989 | Herrick et al. |
| 4,860,956 A | 8/1989 | Fage |
| 4,865,256 A | 9/1989 | Durand |
| 4,894,985 A | 1/1990 | Dubois |
| 4,909,346 A | 3/1990 | Torkelson |
| 4,914,905 A | 4/1990 | Dubois |

(Continued)

FOREIGN PATENT DOCUMENTS

| | | |
|---|---|---|
| FR | 2601077 | 1/1988 |
| WO | 86/00862 A1 | 2/1986 |

OTHER PUBLICATIONS

U.S. Appl. No. 11/941,378, filed Nov. 16, 2007, entitled "Thrust Reverser for a Turbofan Gas Turbine Engine", by Jean-Pierre Lair.

(Continued)

*Primary Examiner* — Timothy D Collins
*Assistant Examiner* — Steven Hawk
(74) *Attorney, Agent, or Firm* — Francis L. Conte (57) ABSTRACT

A thrust reverser door is provided, in one configuration, with a plurality of peripherally-disposed frames circumferentially spaced apart from one another and projecting radially inwardly on an interior side of the door to thereby provide a channel for redirecting thrust.

28 Claims, 7 Drawing Sheets

U.S. PATENT DOCUMENTS

| | | | |
|---|---|---|---|
| 4,916,895 A | 4/1990 | Dubois |
| 4,922,712 A | 5/1990 | Matta |
| 4,922,713 A | 5/1990 | Barbarin |
| 4,960,243 A | 10/1990 | Dubois |
| 4,966,327 A | 10/1990 | Fage et al. |
| 4,976,466 A | 12/1990 | Vauchel |
| 4,998,409 A | 3/1991 | Mutch |
| 5,003,770 A | 4/1991 | Schegerin |
| 5,039,171 A | 8/1991 | Lore |
| 5,040,730 A | 8/1991 | Hogie |
| 5,083,426 A | 1/1992 | Layland |
| 5,090,197 A | 2/1992 | Dubois |
| 5,097,661 A | 3/1992 | Lair et al. |
| 5,101,621 A | 4/1992 | Mutch |
| 5,117,630 A | 6/1992 | Cariola |
| 5,120,004 A | 6/1992 | Matthias |
| 5,167,118 A | 12/1992 | Torkelson |
| 5,176,340 A | 1/1993 | Lair |
| 5,181,676 A | 1/1993 | Lair |
| 5,192,023 A | 3/1993 | Fage et al. |
| 5,197,693 A | 3/1993 | Remlaoui |
| 5,203,525 A | 4/1993 | Remlaoui |
| 5,209,057 A | 5/1993 | Remlaoui |
| 5,211,008 A | 5/1993 | Fage |
| 5,221,048 A | 6/1993 | Lair |
| 5,224,342 A | 7/1993 | Lair |
| 5,228,641 A | 7/1993 | Remlaoui |
| 5,230,213 A | 7/1993 | Lawson |
| 5,243,817 A | 9/1993 | Matthias |
| 5,251,435 A | 10/1993 | Pauley |
| 5,267,438 A | 12/1993 | Bunel |
| 5,284,015 A * | 2/1994 | Carimali et al. ............ 60/226.2 |
| 5,297,387 A | 3/1994 | Carimali |
| 5,309,711 A | 5/1994 | Matthias |
| 5,310,117 A | 5/1994 | Fage et al. |
| 5,347,808 A | 9/1994 | Standish |
| 5,372,006 A | 12/1994 | Lair |
| 5,390,879 A | 2/1995 | Lair |
| 5,392,991 A | 2/1995 | Gatti |
| 5,396,762 A * | 3/1995 | Standish ................ 244/110 B |
| 5,419,515 A | 5/1995 | Lair |
| 5,440,875 A | 8/1995 | Torkelson |
| 5,473,886 A | 12/1995 | Lebrun |
| 5,524,431 A | 6/1996 | Brusson |
| 5,548,954 A | 8/1996 | de Cambray |
| 5,558,594 A | 9/1996 | Lefranc |
| 5,615,549 A | 4/1997 | Valleroy |
| 5,615,834 A | 4/1997 | Osman |
| 5,655,360 A | 8/1997 | Butler |
| 5,666,802 A | 9/1997 | Lair |
| 5,671,598 A * | 9/1997 | Standish ................ 244/110 B |
| 5,716,025 A | 2/1998 | Meyer |
| 5,720,449 A | 2/1998 | Laboure |
| 5,725,182 A | 3/1998 | Valleroy |
| 5,727,380 A | 3/1998 | Lardy et al. |
| 5,730,392 A | 3/1998 | Lair |
| 5,765,362 A | 6/1998 | Gonidec |
| 5,775,097 A | 7/1998 | Lardy |
| 5,775,639 A | 7/1998 | Fage |
| 5,778,659 A | 7/1998 | Duesler |
| 5,778,660 A | 7/1998 | Jean |
| 5,779,192 A | 7/1998 | Metezeau et al. |
| 5,782,434 A | 7/1998 | Jean |
| 5,785,249 A | 7/1998 | Metezeau |
| 5,794,433 A | 8/1998 | Peters |
| 5,799,903 A | 9/1998 | Vauchel |
| 5,806,302 A | 9/1998 | Cariola |
| 5,813,220 A | 9/1998 | Portal |
| 5,819,527 A | 10/1998 | Fournier |
| 5,819,528 A | 10/1998 | Masson |
| 5,826,823 A | 10/1998 | Lymons |
| 5,836,149 A | 11/1998 | Servanty |
| 5,852,928 A | 12/1998 | Vauchel |
| 5,853,148 A | 12/1998 | Standish |
| 5,863,014 A | 1/1999 | Standish |
| 5,875,995 A | 3/1999 | Moe |
| 5,893,265 A * | 4/1999 | Gonidec et al. ............ 244/110 B |
| 5,899,059 A | 5/1999 | Gonidec |
| 5,904,041 A | 5/1999 | Dhainault |
| 5,913,476 A | 6/1999 | Gonidec |
| 5,927,647 A | 7/1999 | Masters |
| 5,930,991 A | 8/1999 | Fournier |
| 5,934,613 A | 8/1999 | Standish |
| 5,937,636 A | 8/1999 | Gonidec |
| 5,947,625 A | 9/1999 | Vauchel |
| 5,956,939 A | 9/1999 | Fage |
| 5,960,626 A | 10/1999 | Baudu |
| 5,967,460 A | 10/1999 | Baudu |
| 5,970,704 A | 10/1999 | Lardy |
| 5,974,783 A | 11/1999 | Gonidec |
| 5,983,625 A | 11/1999 | Gonidec |
| 5,987,881 A | 11/1999 | Gonidec |
| 5,996,937 A | 12/1999 | Gonidec |
| 5,997,054 A | 12/1999 | Baudu |
| 6,000,216 A | 12/1999 | Vauchel |
| 6,009,702 A | 1/2000 | Gonidec |
| 6,026,638 A | 2/2000 | Gonidec |
| 6,027,071 A | 2/2000 | Lair |
| 6,029,439 A | 2/2000 | Gonidec |
| 6,032,901 A | 3/2000 | Carimali |
| 6,044,641 A | 4/2000 | Baudu |
| 6,045,091 A | 4/2000 | Baudu |
| 6,065,285 A | 5/2000 | Gonidec |
| 6,068,213 A | 5/2000 | Gonidec |
| 6,076,347 A | 6/2000 | Gonidec |
| 6,079,201 A | 6/2000 | Jean |
| 6,082,096 A | 7/2000 | Vauchel |
| 6,094,908 A | 8/2000 | Baudu |
| 6,101,807 A | 8/2000 | Gonidec |
| 6,105,439 A | 8/2000 | Roger |
| 6,145,301 A | 11/2000 | Gonidec |
| 6,145,786 A | 11/2000 | Baudu |
| 6,148,607 A | 11/2000 | Baudu |
| 6,151,884 A * | 11/2000 | Gonidec et al. ........... 244/110 B |
| 6,151,885 A | 11/2000 | Metezeau |
| 6,151,886 A | 11/2000 | Vauchel |
| 6,158,211 A | 12/2000 | Gonidec |
| 6,170,254 B1 | 1/2001 | Cariola |
| 6,170,255 B1 | 1/2001 | Gonidec |
| 6,173,807 B1 | 1/2001 | Welch et al. |
| 6,216,980 B1 | 4/2001 | Baudu |
| 6,237,325 B1 | 5/2001 | Hogie |
| 6,256,979 B1 | 7/2001 | Fournier |
| 6,260,801 B1 | 7/2001 | Peters |
| 6,276,026 B1 | 8/2001 | Wille |
| 6,293,495 B1 | 9/2001 | Aten |
| 6,357,672 B1 | 3/2002 | Cowan et al. |
| 6,385,964 B2 | 5/2002 | Jean |
| 6,402,092 B1 | 6/2002 | Jean |
| 6,438,942 B2 | 8/2002 | Fournier |
| 6,487,845 B1 | 12/2002 | Modglin |
| 6,546,715 B1 | 4/2003 | Blevins |
| 6,546,716 B2 | 4/2003 | Lair |
| 6,568,172 B2 | 5/2003 | Jannetta et al. |
| 6,584,763 B2 | 7/2003 | Lymons |
| 6,592,074 B2 | 7/2003 | Dehu |
| 6,622,964 B2 | 9/2003 | Rouyer |
| 6,688,098 B2 | 2/2004 | Rouyer |
| 6,688,099 B2 | 2/2004 | Lair |
| 6,751,944 B2 | 6/2004 | Lair |
| 6,786,038 B2 | 9/2004 | Lair |
| 6,804,947 B2 | 10/2004 | Le Docte |
| 6,820,410 B2 | 11/2004 | Lair |
| 6,845,607 B2 | 1/2005 | Lair |
| 6,845,946 B2 | 1/2005 | Lair |
| 6,895,742 B2 | 5/2005 | Lair et al. |
| 6,910,328 B1 | 6/2005 | Joyce |
| 6,926,234 B2 | 8/2005 | Colotte |
| 6,938,408 B2 | 9/2005 | Lair |
| 6,945,031 B2 | 9/2005 | Lair |
| 6,966,175 B2 | 11/2005 | Lair |
| 6,968,675 B2 | 11/2005 | Ramlaoui et al. |
| 6,971,229 B2 | 12/2005 | Lair |
| 6,976,352 B2 | 12/2005 | Lair |
| 6,983,588 B2 | 1/2006 | Lair |
| 6,993,819 B2 | 2/2006 | Homann |
| 7,007,454 B2 | 3/2006 | Dehu |

| | | |
|---|---|---|
| 7,010,905 B2 | 3/2006 | Lair |
| 7,043,897 B2 | 5/2006 | Osman |
| 7,055,329 B2 | 6/2006 | Martens et al. |
| 7,093,793 B2 | 8/2006 | Lair |
| 7,127,880 B2 | 10/2006 | Lair |
| 7,146,796 B2 | 12/2006 | Lair |
| 7,229,247 B2 | 6/2007 | Durocher et al. |
| 7,255,307 B2 | 8/2007 | Mayes |
| RE39,972 E | 1/2008 | Royalty |
| 2004/0139726 A1 | 7/2004 | Colotte |
| 2005/0151012 A1 | 7/2005 | Lair |
| 2005/0183894 A1 | 8/2005 | Lair |
| 2006/0005530 A1 | 1/2006 | Blin |
| 2006/0288688 A1 | 12/2006 | Lair |
| 2008/0072570 A1 | 3/2008 | Lair |
| 2009/0127390 A1* | 5/2009 | Lair .................. 244/110 B |

OTHER PUBLICATIONS

U.S. Appl. No. 11/941,360, filed Nov. 16, 2007, entitled "Thrust Reverser Door", by Jean-Pierre Lair.

U.S. Appl. No. 11/941,371, filed Nov. 16, 2007, entitled "Pivoting Door Thrust Reverser for a Turbofan Gas Turbine Engine", by Jean-Pierre Lair.

U.S. Appl. No. 11/941,395, filed Nov. 16, 2007, entitled "Pivoting Fairings for a Thrust Reverser", by Jean-Pierre Lair.

U.S. Appl. No. 11/941,388, filed Nov. 16, 2007, entitled "Thrust Reverser", by Jean-Pierre Lair.

U.S. Appl. No. 12/142,084, filed Jun. 19, 2008, entitled "Thrust Reverser for a Turbofan Gas Turbine Engine", by Jean-Pierre Lair and Paul Weaver.

* cited by examiner

THRUST REVERSER DOOR

TECHNICAL FIELD

The invention relates to a thrust reverser for a turbofan gas turbine engine, and in particular a thrust reverser door.

BACKGROUND

The width of the thrust reverser doors is one of the design parameters which is important, as it plays a direct role in the effectiveness and efficiency of a thrust reverser. While the geometrical width of the doors is often dependent on the cross section of the nacelle on which the thrust reverser is installed, the effective width of the doors tends to be smaller than the geometrical width because the relatively large longitudinal side frame members, provided for structural and aerodynamic reasons, decrease the reverser efficiency and increases the risk of reverse efflux side spillage. There is thus a need that the reverse efflux be better contained by the reverser doors and the reverser efficiency be higher than with known arrangements.

SUMMARY

In one aspect, the present concept provides a thrust reverser comprising a door having two longitudinal sides and a plurality of longitudinally-extending frames adjacent each of said longitudinal sides, the frames disposed on an interior side of the door, the frames having circumferentially spaced apart walls projecting radially from the interior side of the door, the walls extending generally along at least a portion of a length of the longitudinal sides, the walls defining at least one channel therebetween which is open on its radially inward side.

In another aspect, the present concept provides a thrust reverser comprising at least first and second doors movable between a stowed position and a deployed position, the doors defining a leading edge and two longitudinal sides extending therefrom and having an inner side with a thrust-deflecting surface redirecting engine thrust when the door is in the deployed position, the inner side defining a plurality of channels open to the inner side of the door, one channel extending along at least a portion of each longitudinal side of the door.

In another aspect, the present concept provides a method of redirecting engine thrust, the method comprising the steps of: (a) deploying a door in a thrust flow to provide thrust redirection, the door having a leading edge and longitudinal sides extending from the leading edge, said redirection having a primary flow in a forward direction toward the leading edge and at least' one secondary flow in a lateral direction towards said longitudinal sides; and then (b) further redirecting said at least one secondary flow towards the leading edge.

In another aspect, the present concept provides a method of providing a thrust reverser door, the method comprising the steps of: providing a door skin having at least a leading edge and two longitudinal edges extending therefrom; providing a radially-inwardly-extending structural frame extending along at least a portion of each longitudinal edge; and providing an aerodynamic wall extending along the structural frame.

Further details of these and other aspects of the improvements presented herein will be apparent from the detailed description and appended figures.

DETAILED DESCRIPTION

Figure 1:
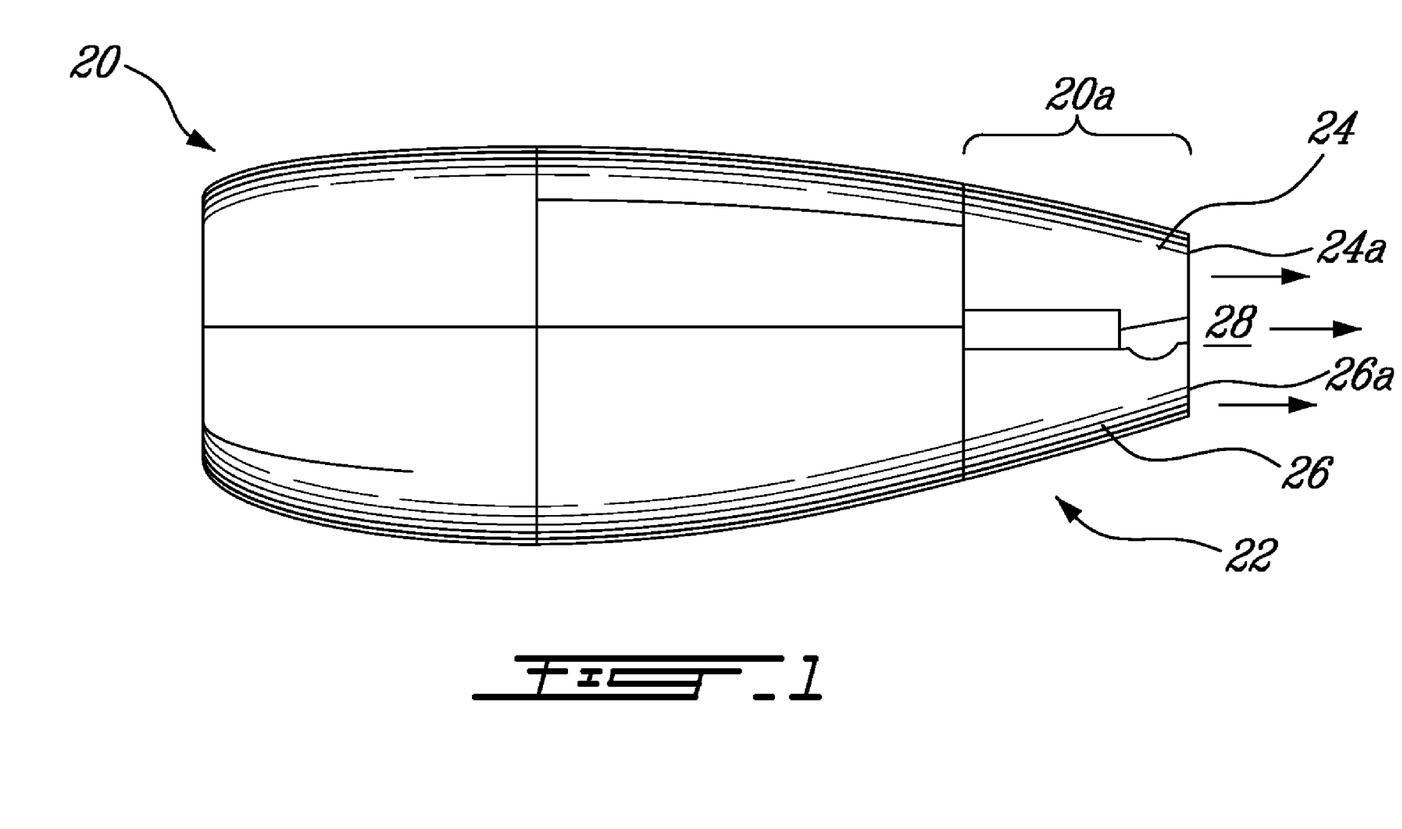
FIG. 1 is a side view of an example of a nacelle provided with a thrust reverser according to the present approach, its doors being shown in a stowed position.

Referring now to FIG. 1, there is shown an example of a nacelle 20 including a thrust reverser 22 in the aft section 20a of the nacelle 20. The turbofan gas turbine engine is located within the nacelle 20 and the nacelle 20 is attached under the wings or on the fuselage of the aircraft using an appropriate arrangement (not shown). The thrust reverser 22 comprises two opposite pivoting doors 24, 26 of the target/bucket door type, forming most of the exhaust nozzle of the nacelle 20 when they are in their stowed position. In the example illustrated in FIG. 2, one door 24 is at the upper side and the other door 26 is at the bottom side.

Figure 2:
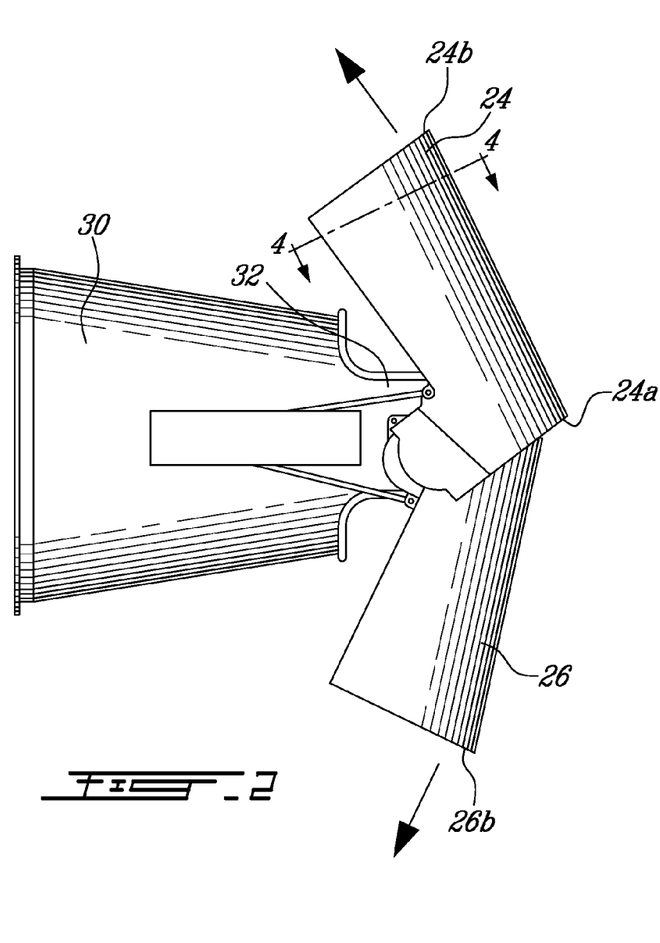
FIG. 2 is a schematic side view of an example of a jet pipe to which are connected thrust reverser doors according to the present approach, which doors are shown in a deployed position.
Figure 3:
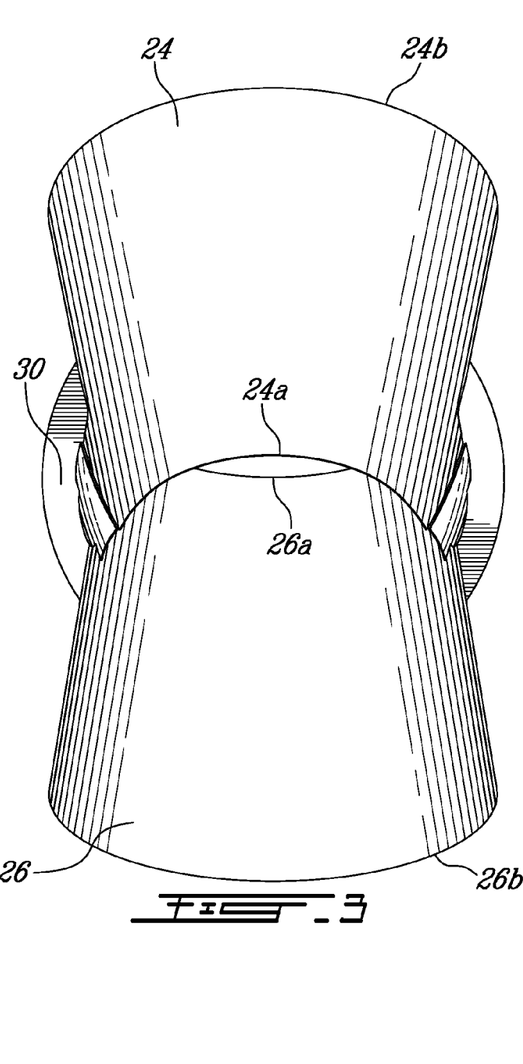
FIG. 3 is a rear view of what is shown in FIG. 2.

Each door 24, 26 has a trailing edge 24a, 26a adjacent to the propulsive jet outlet 28. The arrows in FIG. 1 show the direct thrust operation of the engine. The trailing edges 24a, 26a cooperate with the trailing edge of side arms 32 of a jet pipe 30 located inside the aft section 20a of the nacelle 20 and to which the doors 24, 26 are pivotally connected, as shown in FIG. 2. FIG. 2 is an enlarged view showing an example of the jet pipe 30 and the doors 24, 26 in their deployed position. FIG. 3 is a rear view of what is shown in FIG. 2. The jet pipe 30 is concealed inside the aft section 20a of the nacelle 20 when the doors 24, 26 are in their stowed position, as in FIG. 1.

The arrows in FIG. 2 indicate the main flow path when the engine is operated during a thrust reversal. As can be seen, gases coming out of the engine are deviated substantially toward the front when the doors 24, 26 are in their deployed position. The gases exit the doors 24, 26 in the vicinity of their leading edges 24b, 26b. These edges 24b, 26b are located at the front of the doors 24, 26 and are referred to as "leading" edges with reference to the travel path of the aircraft. The reverser doors 24, 26 redirect the gases coming out of the engine for generating a resulting horizontal retarding force opposing the forward movement of the aircraft. Increasing the output thrust generated by the engine increases the aerodynamic decelerating force. In the illustrated example, the trailing edge 24a of the upper door 24 is pivoted behind the trailing edge 26a of the lower door 26, this resulting from the asymmetrical positioning of the pivots with reference to the horizontal center plane of the jet pipe 30 as disclosed in applicant's co-pending application Ser. No. 11/534,202, filed Sep. 21, 2006. The operation of the presently-described concept, however, is not dependent on such a door and pivot configuration, and any suitable arrangement may be employed.

It should be noted that although the doors 24, 26 are described herein and shown in the drawings as being an upper reverser door 24 and a lower reverser door 26 movable in a vertical plane, doors can also be configured with another orientation, such as a left door and right door movable in a horizontal plane. Also, the skilled reader will appreciate that it is possible to provide an arrangement using the present techniques in which the trailing edge 26a of the lower door 26 is pivoted behind the trailing edge 24a of the front door 24 as mentioned above. Other arrangements are possible as well.

Figure 4:
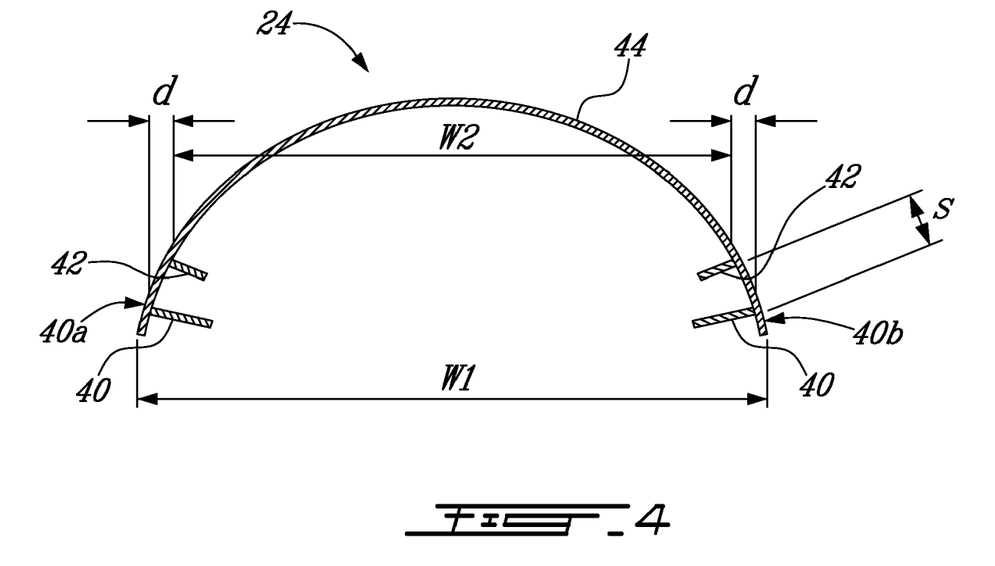
FIG. 4 is a schematic cross-sectional view showing an example of the thrust reverser door of FIGS. 1 to 3.
Figure 5:
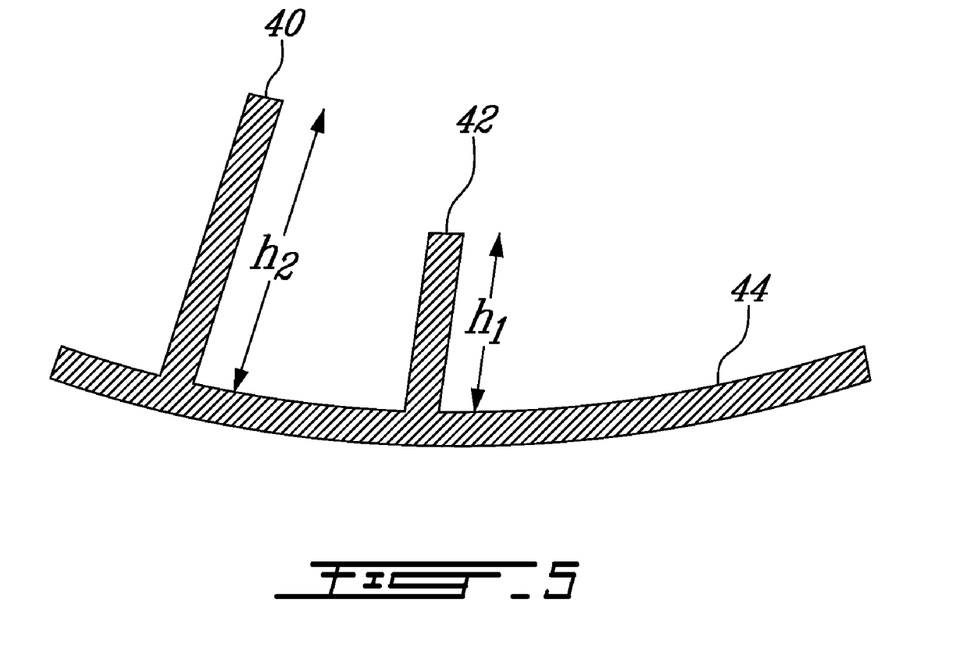
FIG. 5 is a schematic cross-sectional view showing a portion of one embodiment of the door of FIG. 4.
Figure 6:
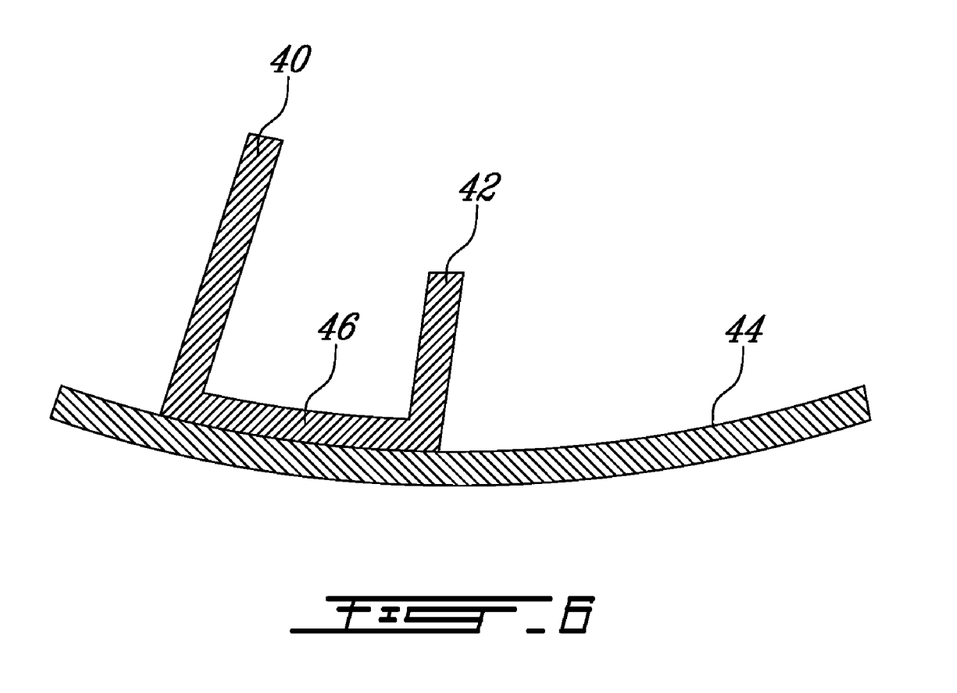
FIG. 6 is a view similar to FIG. 5, showing a portion of another embodiment of the door of FIG. 4.
Figure 7:
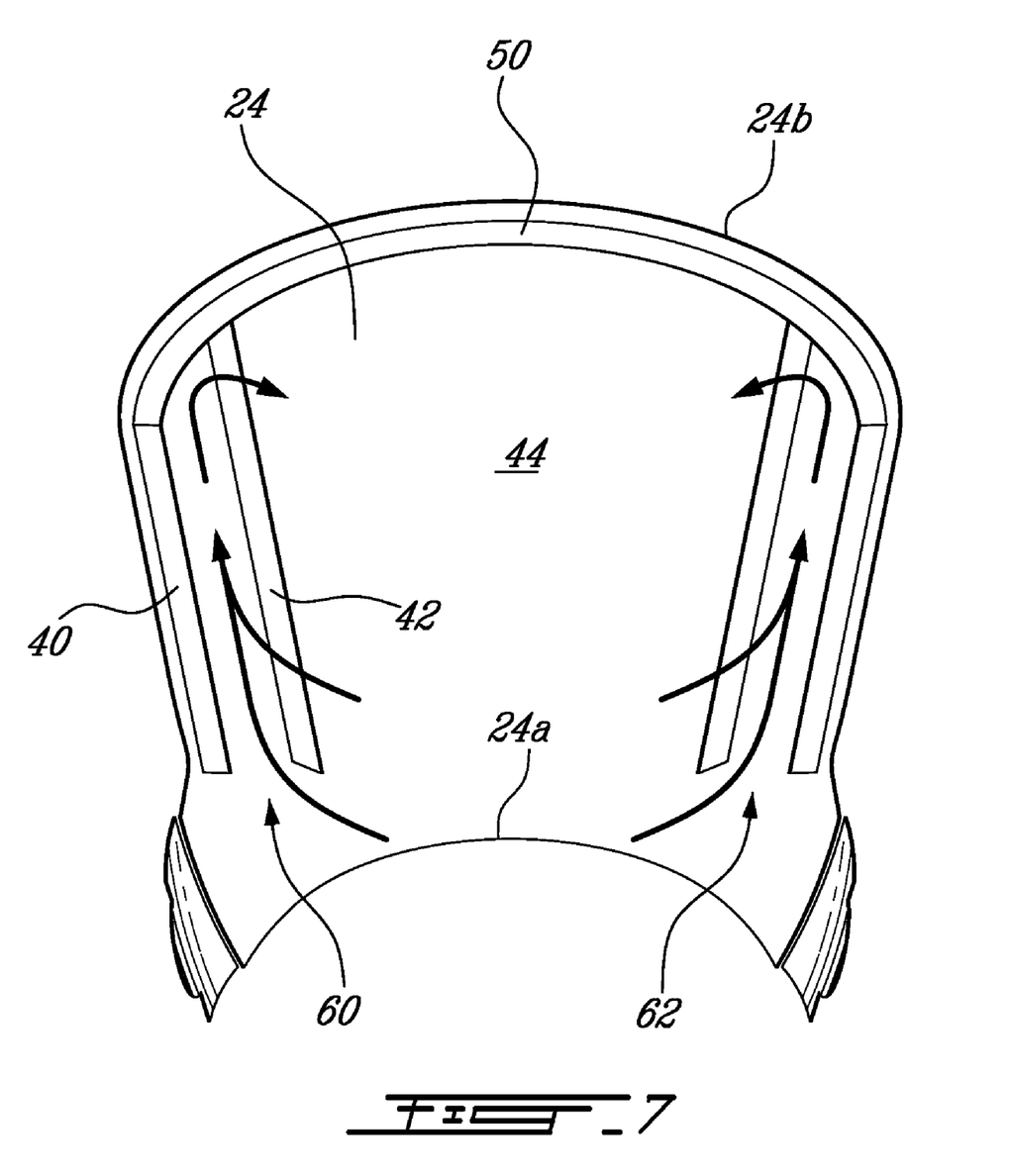
FIG. 7 is a somewhat schematic face-on view of the interior side of an example of a deployed upper door.

FIG. 4 schematically shows a cross section taken along the lines 4-4 in FIG. 3, with a view of the interior side of the thrust reverser door 24. A similar view could be made of the inside of the lower door 26. The reverser door 24 includes, extending longitudinally or axially along, and parallel to and in the vicinity of each of the door's longitudinal sides 40a, 40b, preferably two longitudinal frame walls 40, 42 that are substantially parallel to one another and extend generally radially inwardly relative to the door 26. The frames 40, 42 are preferably provided relatively close to the longitudinal sides to provide structural support thereto. The frames 40, 42 may be machined integrally with the single skin 44 of the door, as shown in FIG. 5, or provided as a separate element(s) 46 mounted to the skin 44 of the door, as shown in FIG. 6. The connection of the element 46 to skin 44 can be made using an appropriate arrangement, such as bolts, rivets, welding, etc. Other arrangements are possible as well. The frame members 40, 42 are, in this example, in the form of a channel with two spaced-apart frame walls 40, 42, namely an outer frame wall 40 and an inner frame wall 42, extending radially inwardly from the skin 44 of the reverser door 24. The height of inner frame wall 42 is preferably smaller than the height of the outer frame wall 40, as discussed further below. For structural purposes, the longitudinal frame walls 40, 42 preferably connect to a laterally-extending radial frame wall 50, as shown in FIG. 7, located in the vicinity of the reverser door's leading edge 24b, and to the rear frame of the door 24 in a suitable manner (not shown). The length of the longitudinal frame members 40, 42 may be less than the length of the door 24, 26. As seen in FIG. 7, the lateral frames 40, 42 need not extend along the entire longitudinal length of the door, but preferably extend at least to the door leading edge. In the example of FIG. 7, the frames 40, 42 extend from the vicinity of the leading edge of the doors 24 to the vicinity of the door pivot arms (not shown).

As can be seen in FIG. 4, the frame walls 40, 42 are circumferentially spaced from each other by a distance "s". The inner frame wall 42 has a height "h1" that is preferably smaller than a height "h2" of outer frame wall 40, as shown in FIG. 5. The values of "h1" and "h2" are chosen to provide the desired structural rigidity and aerodynamic performance of the thrust reverser door (as discussed further below), as well as to fit within the space available between the nacelle 20 and the jet pipe 30 when the doors 24, 26 are in their stowed position. Whether or not h2>h1 is possible will depend on the envelope available, the structural requirements, etc, as the skilled reader will appreciate. It will also be understood that, because the inner and outer profiles of the reverser door are typically converging from the reverser door leading edge to trailing edge, the heights h1, h2 may not be constant along the length of frames 40, 42, and will typically decrease from the leading edge toward the trailing edge.

Referring to FIG. 7, in use the doors of the thrust reverser are deployed when the aircraft is on the ground to generate reverse thrust. As thrust flows (indicated by the large arrows) into the door, it is redirected generally forwardly (See also FIG. 2). Laterally flowing air (i.e. what would otherwise be side spillage) enters channels 60, 62, and is generally captured therein, and redirected along the channels 60, 62 towards the door leading edge 24b, and ultimately redirected forwardly, along with the main efflux of the reverser. Hence, what would otherwise be side spillage is captured and redirected in the forward direction to generate useful work. As mentioned, the role of the two frames 40, 42 is therefore both structural and aerodynamic. The frames 40, 42 maintain the structural integrity of the door, but they also help to reduce the sideways spillage or leakage of the exhaust gases from the door when deployed, the skilled reader appreciating that thrust diverted laterally (sideways) does not participate in the retarding force of the thrust reverser and consequently decreases the overall thrust reversing efficiency of the efflux that is directed forwardly. As can be seen in FIG. 4, the door width is characterized by two distinct dimensions; the first one is the geometrical width "W1", the second one is the effective width "W2". The geometrical width W1 is the actual geometrical width dimension of the door between the edges of its opposite longitudinal sides. The effective width W2 is the actual width dimension between the two opposite innermost longitudinal frame members 42. In the reverser door 24, the pair of longitudinal frames 40, 42 on each side provides respective channels 60, 62 formed between the frame walls 40, 42, having a circumferential width "s", through which the reverser thrust air flow circulates when the reverser door 24 is deployed. The channels 60, 62 are preferably uninterrupted along their lengths and open to the interior of the door 24, so that an air flow, such as engine thrust, may enter the channels 60, 62, travel along its length, and then exit the channel. The channels 60, 62 increase the effectiveness of the reverser door 24 since air is directed to now flow, in a contained manner, longitudinally near to reverser door sides to reduce, and preferably even effectively eliminate, the reverse thrust flow spillage laterally over each side of the reverser door 24 when deployed. Since two channels 60,62 are provided with circumferential width "s" having corresponding lateral width "d", the width of the effective thrust reversing surface may therefore be increased by a value equal to "2d," or W2+2d. As mentioned above, when the thrust reverser doors 24, 26 are deployed they need to contain the engine gas efflux and re-direct it in the forward direction efficiently. The containment of the lateral efflux contributes to a high reversing efficiency and prevents impingement of lateral efflux on critical control surface of the aircraft. The longitudinal frames 40, 42 of the reverser door 24, 26 significantly improve the aerodynamic efficiency of the reverser doors 24, 26 by improving containment of the efflux by capturing the efflux in the channels and permitting thrust to be contained on a larger area of the reverser door. The side spillage, if any, is decreased, the thrust reversing efficiency is improved as well as the controllability of the aircraft on the ground.

Figure 8:
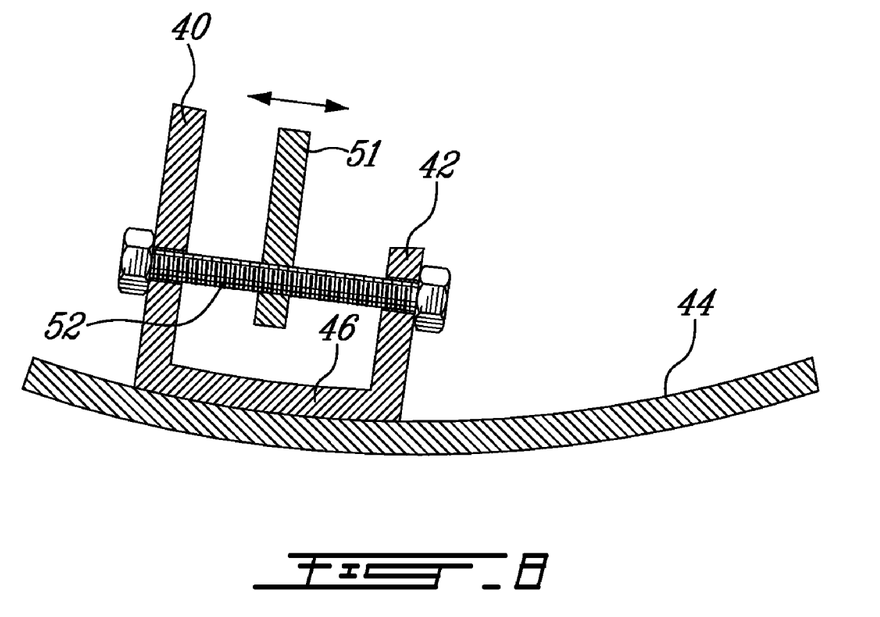
FIG. 8 is a view similar to FIG. 5, showing a portion of another embodiment of the door.

Additional longitudinal frames may be provided. For example, as shown in FIG. 8, a third longitudinal frame 51 is provided between longitudinal frames 40, 42. The third longitudinal frame 51 in this example extends along the skin 44 between the other two frames 40, 42. The third frame 51 can be made adjustable using screws 52 (only one being shown) so that its position can be changed along the sides of the door, moving closer to one or the frames 40, 42 or the other. This feature allows the width of the door to be adjusted, which feature can be useful during tests or to adapt a same door model on different aircraft.

Figure 9:
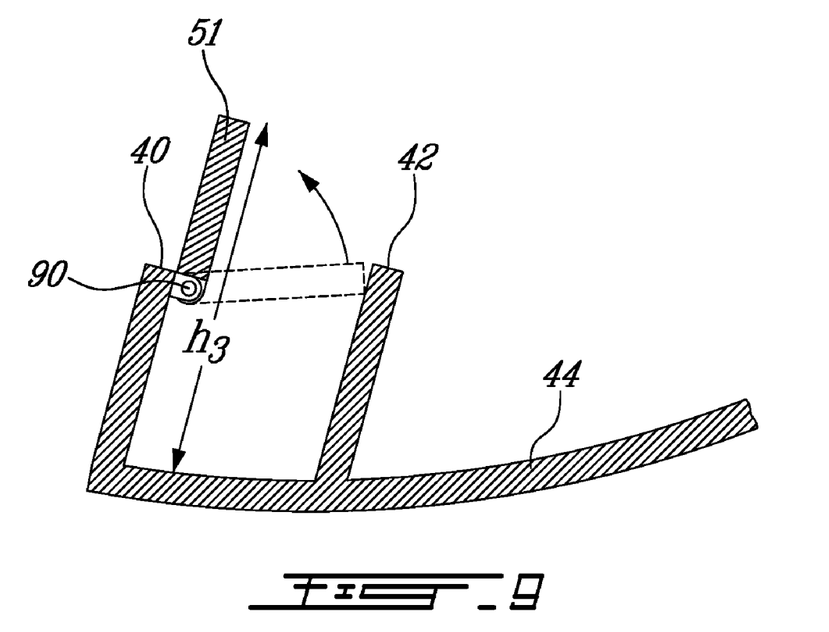
FIG. 9 is a view similar to FIG. 5, showing a portion of another embodiment of the door.

Referring to FIG. 9, showing another embodiment, a third frame 51 is provided with a pivot connect 90, such that the third frame 51 may pivot between the frames 40, 42 around a longitudinal axis located in the vicinity of the free edge of the frame 40 to effectively extend the height of the frame 40 during door deployment. This allows an increase of the deployed height h3 that is greater than the height h2 of the frame 40. The pivoting frame 51 may be biased (e.g. spring-loaded, not shown) towards its extended position, and when the reverser doors 24, 26 are stowed, the pivoting third frame 51 is forced by the fixed structure to pivot back into its stowed position. When the reverser doors 24, 26 are subsequently deployed again, the third frame 51 pivots back to its open position, and so on. This approach may be employed, for example, in the case where the space available when the doors 24, 26 are stowed is not sufficient to give the frame 40 the desired aerodynamic height.

Figure 10:
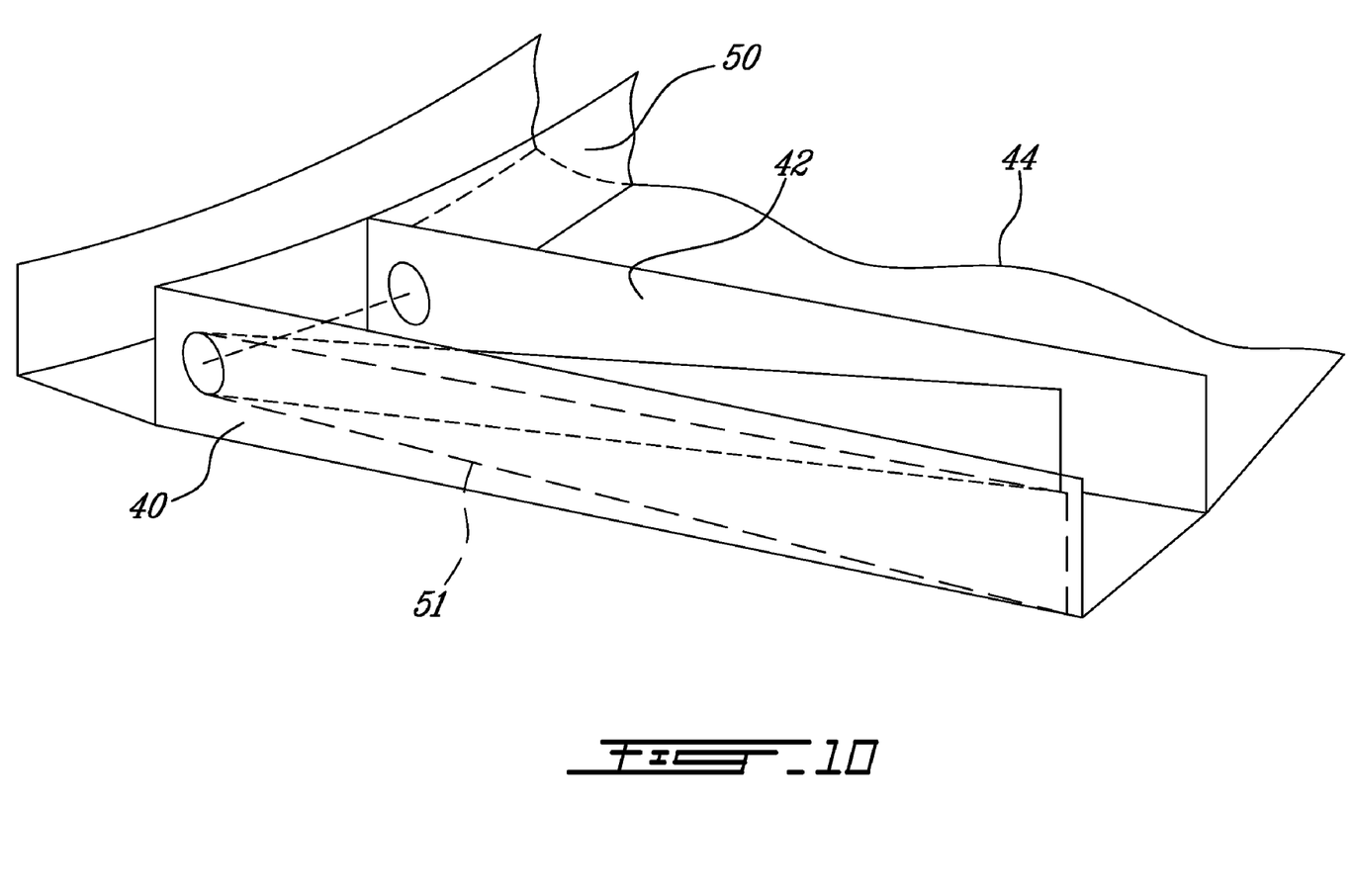
FIG. 10 is a somewhat schematic view showing another embodiment, in which the frame pivots around a transverse axis.

While additional frame 51 is shown having a longitudinal pivoting axis following the free edge of frame 40, in another embodiment shown in FIG. 10, frame 51 may have its pivoting axis substantially transverse to frames 40 and 42. In such case, the pivoting axis is located in the vicinity of the reverser door leading edge, and when the reverser doors are deployed, frame 51 that is biased towards its opened position, opens and gradually increases the height of frame 40 from a minimum value located in the vicinity of the frame pivoting axis to a maximum value located at the opposite end of the frame 51. In this embodiment, frame 51 induces a maximum increase of the height of frame 40 in the vicinity of the reverser doors hinges, area that is most likely to generate side spillage.

The above description is meant to be exemplary only, and one skilled in the art will recognize that other changes may also be made to the embodiments described without departing from the scope of the invention disclosed. For instance, the shape and configuration of the doors may be different to what is described, and any suitable door arrangement may be employed. The longitudinal frames may be identical to one another, or may have different sizes, configurations, etc. The longitudinal frames may also may not be symmetrically shaped or placed on the door. The width W2 may be constant or vary along the door length. The heights h1 and/or h2 may be constant or vary along the door length. The spacing may be constant or vary along the door length. Frames 40, 42 need not be provided to define channels 60, 62, but rather any suitable manner of defining the channels may be used, such as defining with other mechanical structures mounted to the door, or the channels may be defined in a surface of the door itself, and so on. Still other modifications will be apparent to those skilled in the art, in light of a review of this disclosure, and such modifications are intended to fall within the scope of the appended claims.

What is claimed is:

1. A thrust reverser comprising a door having two longitudinal sides and a plurality of longitudinally-extending frames adjacent each of said longitudinal sides, the frames disposed on an interior side of the door, the frames having circumferentially spaced apart walls projecting radially from the interior side of the door, the walls extending generally along at least a portion of a length of the longitudinal sides, the walls defining corresponding side channels circumferentially bounding a single primary channel therebetween which side channels are open on their radially inward sides, and the primary channel extends circumferentially over a majority of width of the door for increasing effective thrust reversing surface area of the door.

2. The thrust reverser as defined in claim 1, wherein the walls are generally parallel to one another.

3. The thrust reverser as defined in claim 1, wherein the walls extend from a leading edge of the door.

4. The thrust reverser as defined in claim 3, wherein the walls join in a vicinity of the leading edge, a structural frame extending circumferentially along the door leading edge.

5. The thrust reverser as defined in claim 1, wherein two said walls are provided adjacent each longitudinal side, the two walls defining one said channel.

6. The thrust reverser as defined in claim 1, further comprising at least one additional longitudinally-extending frame pivotally connected to the longitudinally-extending frame closer to one of the longitudinal sides, the additional frame being pivotable between a retracted position and an extended position, the additional frame having at least partially a radial height when in its extended position that is greater than a radial height of said plurality of frames.

7. The thrust reverser as defined in claim 6, wherein the additional frame is pivotable around a pivot axis that is substantially parallel to the longitudinally-extending frame closer to one of the longitudinal sides.

8. The thrust reverser as defined in claim 6, wherein the additional frame is pivotable around a pivot axis that is substantially transverse to the longitudinally-extending frame closer to one of the longitudinal sides.

9. The thrust reverser as defined in claim 1, wherein the longitudinal frame closer to one of the longitudinal sides has a greater height than a remainder of the plurality of frames.

10. The thrust reverser as defined in claim 1, wherein each longitudinally-extending frame has a height greater than a width thereof.

11. The thrust reverser as defined in claim 1, wherein at least some of the longitudinally-extending frames vary in height along a length thereof.

12. A thrust reverser comprising at least first and second doors movable between a stowed position and a deployed position, the doors defining a leading edge and two longitudinal sides extending therefrom and having an inner side with a thrust-deflecting surface redirecting engine thrust when the doors are in the deployed position, the inner side defining a plurality of channels open to the inner side of the doors and including one side channel extending along at least a portion of each longitudinal side of the doors and circumferentially bounding a single primary channel extending circumferentially over a majority of width of each door for increasing effective thrust reversing surface area of the doors.

13. The thrust reverser as defined in claim 12, wherein each channel is defined by a pair of radially extending walls.

14. The thrust reverser as defined in claim 12, wherein each channel has a depth which varies along its length.

15. The thrust reverser as defined in claim 12, wherein the channels end in a vicinity of the leading edge, a structural frame extending circumferentially along the door leading edge.

16. The thrust reverser as defined in claim 12, wherein the portion of the channel extending along each of the longitudinal sides has a greater height than other portions of the channels.

17. A method of redirecting engine thrust, the method comprising the steps of: (a) deploying a door in a thrust flow to provide thrust redirection, the door having a leading edge and longitudinal sides extending from the leading edge, said redirection having a primary flow in a forward direction toward the leading edge in a primary channel extending circumferentially over a majority of width of the door, and at least one secondary flow in a lateral direction towards said longitudinal sides; and then (b) further redirecting said at least one secondary flow towards the leading edge in a side channel extending along one of said longitudinal sides laterally bounding said primary channel for increasing effective thrust reversing surface area.

18. The method as defined in claim 17, wherein said further redirecting includes redirecting along said longitudinal sides to said leading edge.

19. The method as defined in claim 17, wherein said side channel is defined by a pair of spaced apart walls, and wherein the method further comprises structurally stiffening the door using the walls.

20. A method of providing a thrust reverser door, the method comprising the steps of: providing a door skin having at least a leading edge and two longitudinal edges extending therefrom; providing a radially-inwardly-extending structural frame extending along at least a portion of each longitudinal edge; and providing an aerodynamic wall extending along the structural frame, with said frames and wall defining corresponding side channels along each of said longitudinal edges laterally bounding a single primary channel extending circumferentially over a majority of width of the door for reducing side spillage of exhaust flow and increasing effective thrust reversing surface area.

21. The method as defined in claim 20, wherein the side channel is defined between the aerodynamic wall and the structural frame, the side channel extending uninterruptedly to the leading edge of the door.

22. A thrust reverser comprising:
 a pair of thrust reverser doors pivotally mounted to a jet pipe for movement between stowed closed and deployed open positions;
 each of said doors extending between longitudinally opposite leading and trailing edges, and including two pairs of circumferentially outer and inner longitudinal walls bounding circumferentially opposite sides of each door; said wall pairs extend radially inwardly from each door and longitudinally aft from said leading edge thereof to define corresponding side channels bounding a single primary channel extending in circumferential width between said inner walls and open radially inwardly for increasing effective thrust reversing surface area and reducing side spillage of exhaust flow; and
 wherein said inner walls are spaced circumferentially apart over a majority of width of said doors to correspondingly maximize circumferential width of said primary channel for increasing effectiveness of thrust reverser operation.

23. A thrust reverser according to claim 22 wherein said outer and inner walls extend continuously aft together so that said side channels are longitudinally uninterrupted to circumferentially bound said primary channel.

24. A thrust reverser according to claim 23 wherein said outer and inner walls are joined to a circumferentially arcuate radial wall at said door leading edges.

25. A thrust reverser according to claim 23 wherein said outer walls are larger in height than said inner walls to circumferentially bound said side channels over the longitudinal length thereof.

26. A thrust reverser according to claim 23 wherein said doors are circumferentially arcuate, and said outer and inner walls extend longitudinally straight along said opposite circumferential sides thereof.

27. A thrust reverser according to claim 23 further comprising a longitudinal third wall disposed between said outer and inner walls in one of said side channels for adjusting effective thrust reverser width of said doors.

28. A thrust reverser according to claim 27 wherein said third wall is adjustably mounted in said one side channel.

* * * * *